United States Patent
Nakayama et al.

(10) Patent No.: US 7,952,230 B2
(45) Date of Patent: May 31, 2011

(54) CYCLOCONVERTER GENERATOR

(75) Inventors: Shinsaku Nakayama, Wako (JP); Toshinori Inagawa, Wako (JP); Yoshinori Masubuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 12/437,343

(22) Filed: May 7, 2009

(65) Prior Publication Data

US 2009/0279339 A1    Nov. 12, 2009

(30) Foreign Application Priority Data

May 9, 2008  (JP) .................................. 2008-123324

(51) Int. Cl.
*H02J 1/16* (2006.01)
(52) U.S. Cl. ......................................................... 307/47
(58) Field of Classification Search ...................... 307/47
See application file for complete search history.

(56) References Cited

U.S. PATENT DOCUMENTS 6,198,238 B1    3/2001    Edelson

FOREIGN PATENT DOCUMENTS

JP          11-136998 B2    5/1999

*Primary Examiner* — Robert L. Deberadinis
(74) *Attorney, Agent, or Firm* — Arent Fox LLP

(57) ABSTRACT

In a cycloconverter generator equipped with an AC power generator that generates single-phase AC power to be supplied to a load by turning on positive and negative switching elements at variable timing every half-period of a desired AC power frequency based on a phase signal and a DC power generator that generates DC power by turning on the positive switching elements in accordance with a timing determined by desired DC voltage, there is installed with a selection switch that is installed to be operable by an user and produces an output indicative of a result of the user's selection between the AC power and DC power thereby enabling to the user to easily select either one of alternating current and direct current.

4 Claims, 8 Drawing Sheets

CYCLOCONVERTER GENERATOR

BACKGROUND OF THE INVENTION

1. Field of the Invention

This invention relates to a cycloconverter generator, namely a generator that converts AC power of a given frequency to another frequency for output.

2. Description of the Related Art

The cycloconverter generator that produces an output by converting AC power of a given frequency to another frequency is well known. A description of the cycloconverter generator technology can be found, for example, in Japanese Patent No. 3,447,934. The cycloconverter generator described in this reference is equipped with thyristors bridge-connected in antiparallel connection to three-phase output windings in the positive and negative directions and generates single-phase alternating current of a desired frequency by turning on the thyristors at variable timing (width or angle) every half-period of the desired alternating current frequency.

SUMMARY OF THE INVENTION

Although the reference further discloses that direct current can be generated by turning on either one of the positive and negative thyristor groups, it does not describe a technique of switching between alternating current and direct current.

An object of this invention is therefore to overcome this drawback by providing a cycloconverter generator that can generate, in addition to alternating current, direct current at desired voltage and enables a user to easily select either one of alternating current and direct current.

In order to achieve the first objects, this invention provides in its first aspect, a cycloconverter generator equipped with a magneto having three-phase output windings, single-phase output windings facing the permanent magnets to produce phase signals each indicative of a phase of the output of the magneto, a bridge circuit comprising positive and negative switching elements bridge-connected in antiparallel connection to the three-phase output windings to constitute a cycloconverter, and an AC power generator that generates single-phase AC power to be supplied to a load by turning on the positive and negative switching elements at variable timing every half-period of a desired AC power frequency based on the phase signal; a DC power generator that generates DC power to be supplied to the load by turning on one of the positive and negative switching elements in accordance with a timing determined by desired DC voltage based on the phase signal; and a selection switch that is installed to be operable by an user and produces an output indicative of a result of the user's selection between the AC power and the DC power.

In order to achieve the first objects, this invention provides in its second aspect, a method of controlling a cycloconverter generator equipped with a magneto having three-phase output windings, single-phase output windings facing the permanent magnets to produce phase signals each indicative of a phase of the output of the magneto, a bridge circuit comprising positive and negative switching elements bridge-connected in antiparallel connection to the three-phase output windings to constitute a cycloconverter, and an AC power generator that generates single-phase AC power to be supplied to a load by turning on the positive and negative switching elements at variable timing every half-period of a desired AC power frequency based on the phase signal, and a DC power generator that generates DC power to be supplied to the load by turning on one of the positive and negative switching elements in accordance with a timing determined by desired DC voltage based on the phase signal; characterized by the step of: allowing an user to select one between the AC power and the DC power.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

Figure 1:
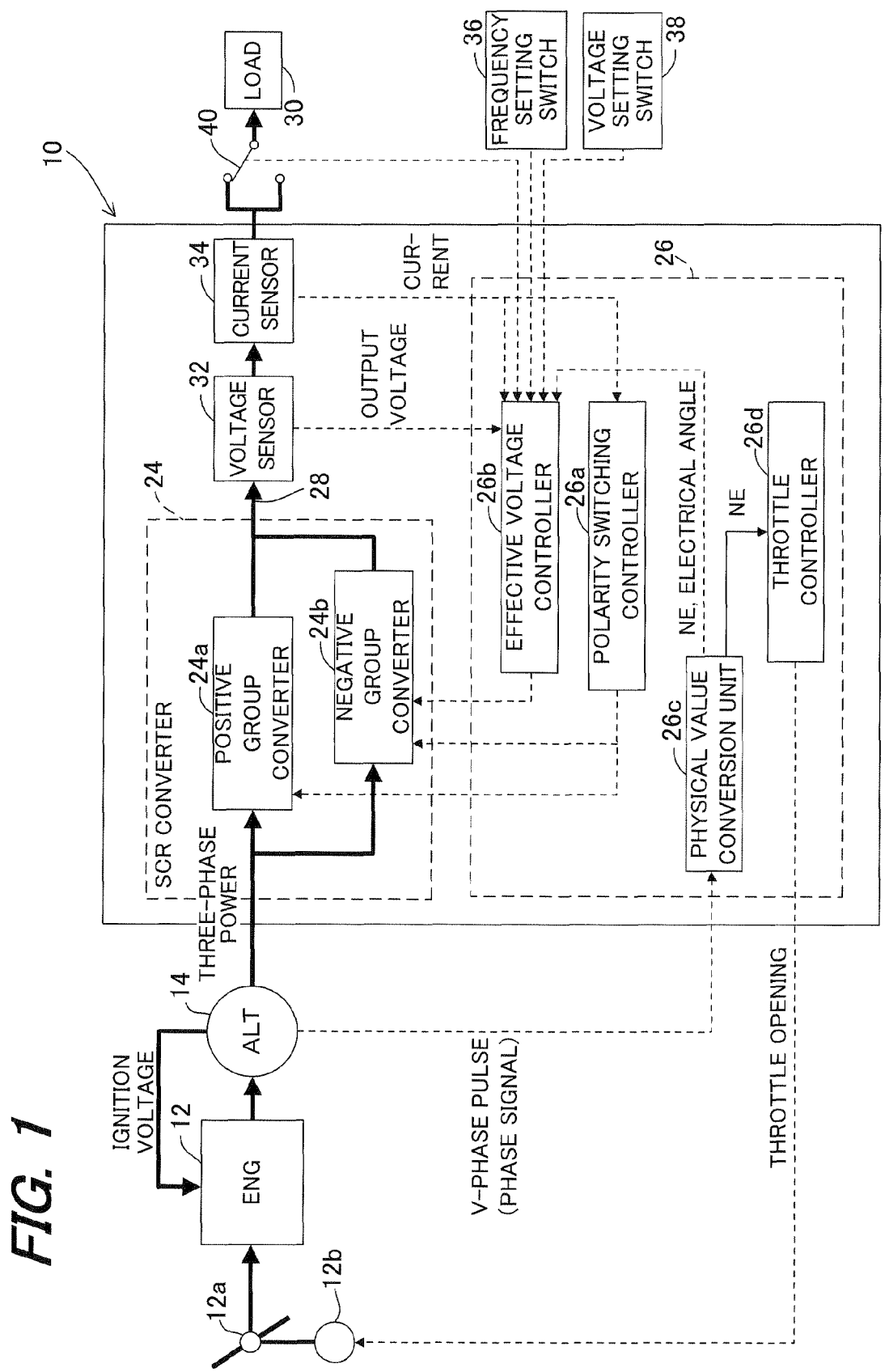
FIG. 1 is a block diagram showing the overall configuration of a cycloconverter generator according to this embodiment of the present invention.

FIG. 1 is a block diagram showing the overall configuration of the cycloconverter generator according to the present invention.

Reference numeral 10 is assigned to the cycloconverter generator in FIG. 1. The generator 10 is equipped with an internal combustion engine 12 (named ENG in the drawing). It has rated outputs of AC 100 V-2.3 kVA and DC 12 V-10 A. The engine 12 is an air-cooled, spark ignition unit whose throttle valve 12a is moved by an actuator 12b comprising a stepper motor or the like. It is started using a recoil starter (not shown).

The generator 10 is equipped with a magneto 14 (named ALT in FIG. 1) that is driven by the engine 12.

Figure 2:
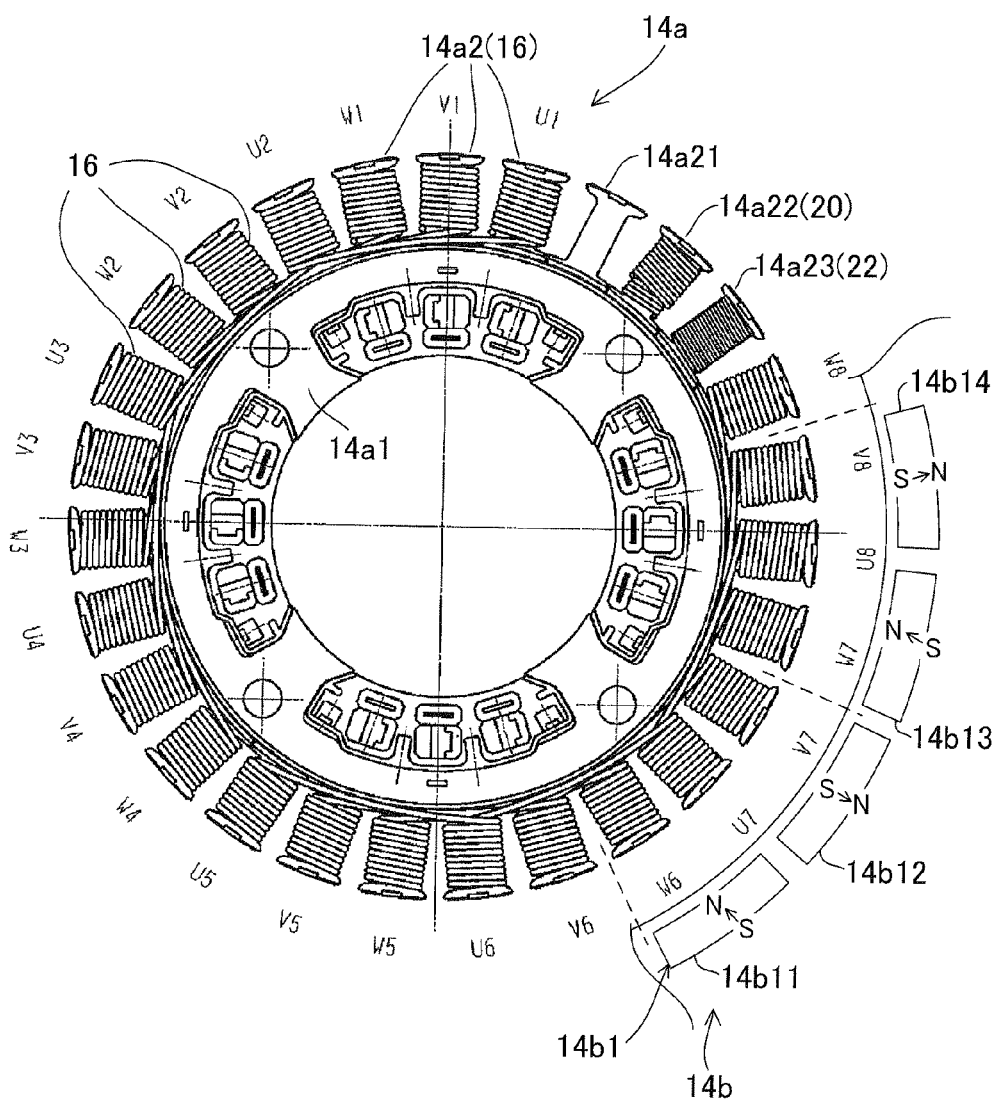
FIG. 2 is a plan view of a stator constituting a magneto shown in FIG. 1.

FIG. 2 is a plan view of a stator 14a of the magneto 14.

The stator 14a is equipped with a stator core 14a1 fastened near the cylinder head of the engine 12. As illustrated, twenty-seven teeth 14a2 are formed to project radially from the stator core 14a1. Twenty-four of the teeth 14a2 are wound with coils Un, Vn and Wn (n: 1 to 8) to form three-phase (U, V and W) output windings (main windings) 16.

Among the three teeth 14a21, 14a22 and 14a23 located between coils U1 and W8, the tooth 14a21 corresponding to W phase is not wound with a coil, while the tooth 14a22 corresponding to V phase and the tooth 14a23 corresponding to U phase are wound with coils to form single-phase output windings 20 and 22.

A rotor 14b is installed around the stator 14a. Nine pairs of permanent magnets 14b1 (18 magnets) are attached inside the rotor 14b at positions opposite the aforesaid coils and with their radially oriented polarities reversed alternately as illustrated. Two permanent magnets 14b1 (e.g., 14b11 and 14b12) form one pair, and one pair of the permanent magnets 14b1 is installed per three teeth 14a2. The rotor 14b also serves as the flywheel of the engine 12.

When the permanent magnets 14b1 of the rotor 14b surrounding the stator 14a rotate, three-phase alternating current is outputted from the three-phase output windings 16 and single-phase alternating current is outputted from the single-phase output winding 20, i.e., V-phase pulses (phase signal) indicating the phase of the output of the magneto 14, more exactly the output of the output windings 16, are outputted from the single-phase output winding 20. Single-phase alternating current is also outputted from the output winding 22.

Returning to the explanation of FIG. 1, the three-phase alternating current generated by the magneto 14 is inputted to a bridge circuit 24 of the cycloconverter.

Figure 3:
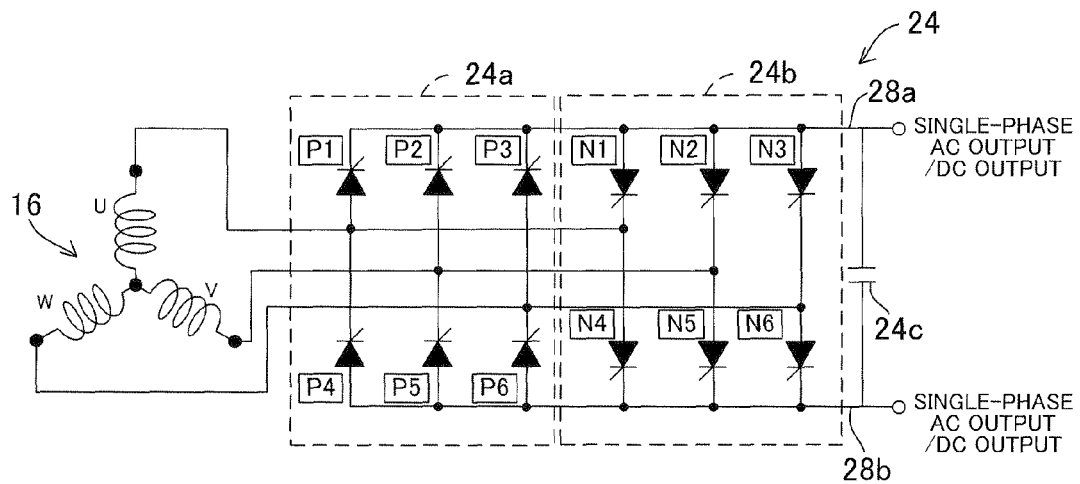
FIG. 3 is a block diagram showing the structure of a bridge circuit of a cycloconverter shown in FIG. 1 in detail.
Figure 4:
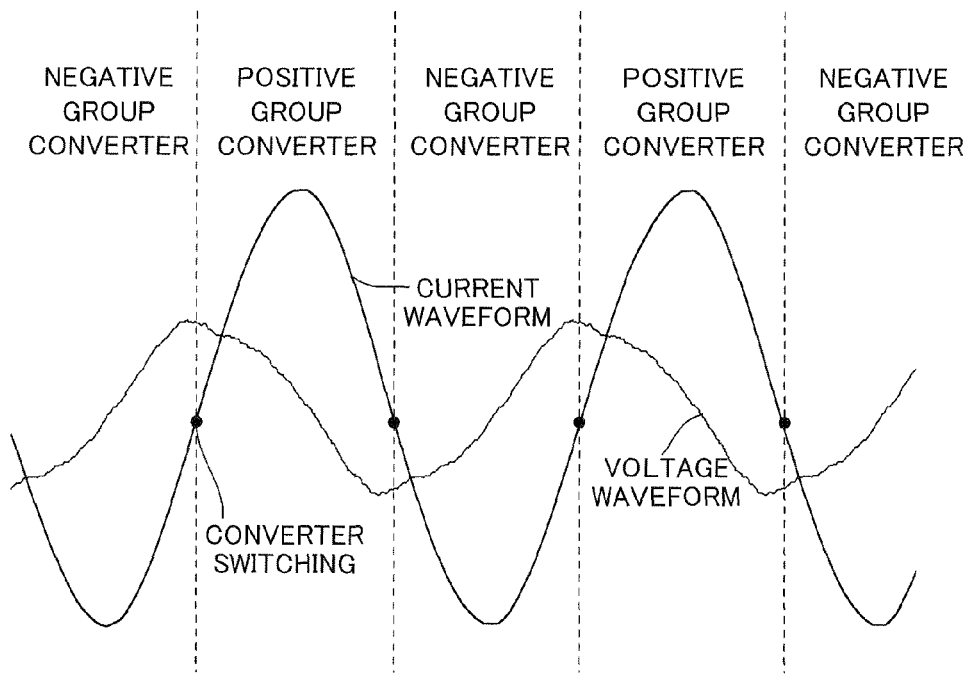
FIG. 4 is a time chart showing the operation of switching (selecting) between a positive group converter and negative group converter by a polarity switching controller of an electronic control unit (ECU) shown in FIG. 1 when converting to alternating current.

FIG. 3 is a block diagram showing the structure of the bridge circuit 24 of the cycloconverter in detail. As illustrated, the bridge circuit 24 of the cycloconverter comprises a positive group converter 24a, a negative group converter 24b and a smoothing capacitor 24c.

The positive group converter 24a comprises a total of six thyristors (SCRs; positive switching element group) Pn (n: 1 to 6) arranged in three parallel connected pairs with their cathodes facing the positive side. The negative group converter 24b comprises the same number of thyristors (SCRs; negative switching element group) Nn (n: 1 to 6) arranged in three parallel connected pairs with their cathodes facing the negative side. Thus the bridge circuit 24 of the cycloconverter is structured as a bridge circuit comprising the positive and negative switching element groups bridge-connected in antiparallel connection to the three-phase output windings 16.

The output terminals of the three-phase output windings 16 are connected to midpoints of the paired thyristors Pn, Nn. In other words, the positive group converter 24a and negative group converter 24b are bridge-connected in antiparallel connection to the three-phase output windings 16.

Returning to the explanation of FIG. 1, the bridge circuit 24 is connected to an Electronic Control Unit (ECU) 26.

The ECU 26 is equipped with a polarity switching controller 26a, an effective voltage controller 26b, a physical value conversion unit 26c, and a throttle controller 26d. The ECU 26 includes a microcomputer equipped with a CPU, ROM, RAM, I/O ports and the like, and the aforesaid effective voltage controller 26b, etc., are operations of the CPU expressed functionally.

As explained further later, the polarity switching controller 26a of the ECU 26 selects (switches to) the one of the positive group converter 24a and negative group converter 24b of the bridge circuit 24 whose thyristors are to be turned on, and the effective voltage controller 26b controls the timing (angle or width). The three-phase alternating current inputted in this manner is converted to single-phase alternating current or direct current that is supplied to a load 30 through a power feed line 28.

As illustrated, the V-phase pulses (phase signal) outputted from the output winding 20 are sent through the physical value conversion unit 26c of the ECU 26 to the polarity switching controller 26a and effective voltage controller 26b. The physical value conversion unit 26c counts the V-phase pulses to detect the engine speed NE. The output of the output winding 22 is wave-formed and supplied as ignition voltage to an ignition coil, etc., of an ignition system (not shown) of the engine 12.

The engine speed NE detected by the physical value conversion unit 26c is sent to the throttle controller 26d. The throttle controller 26d uses an adaptive controller (self-tuning regulator) to regulate the operation of the actuator 12b so as to control the opening/closing of the throttle valve 12a as required to converge the detected engine speed NE to the desired engine speed. The details of this control will not be explained here because they are not directly related to the purport of the invention.

The detected engine speed NE and the phase signal are sent to the effective voltage controller 26b. A voltage sensor 32 and a current sensor 34 are installed in the power feed line 28 and produce outputs or signals proportional to the voltage and current of the power feed line 28. The outputs of the voltage sensor 32 and current sensor 34 are sent to the polarity switching controller 26a and effective voltage controller 26b.

A frequency setting switch (SW) 36 that the operator can use to set or input the desired frequency (60 Hz or 50 Hz according to the commercial power system to be emulated) and a voltage setting switch (SW) 38 that the operator can use to set or select the desired voltage of direct current are provided in the control panel (explained later) of the generator 10 or at some other appropriate location readily accessible to the operator. Outputs of the switches 36, 28 are also sent to the effective voltage controller 26b.

The operation of the polarity switching controller 26a and effective voltage controller 26b will next be explained.

First, explaining regarding the case of converting the three-phase alternating current to single-phase alternating current of the desired frequency of 60 Hz (or 50 Hz) of a commercial power system, the polarity switching controller 26a determines which thyristor between the positive group converter 24a and negative group converter 24b is to be turned on based on the inclination of alternating current detected by the current sensor 34.

Specifically, the polarity switching controller 26a determines that the thyristor of the positive group converter 24a is to be turned on when the detected current exceeds the 0 level on the positive side and that the thyristor of the negative group converter 24b is to be turned on when it exceeds the 0 level on the negative side.

Figure 5:
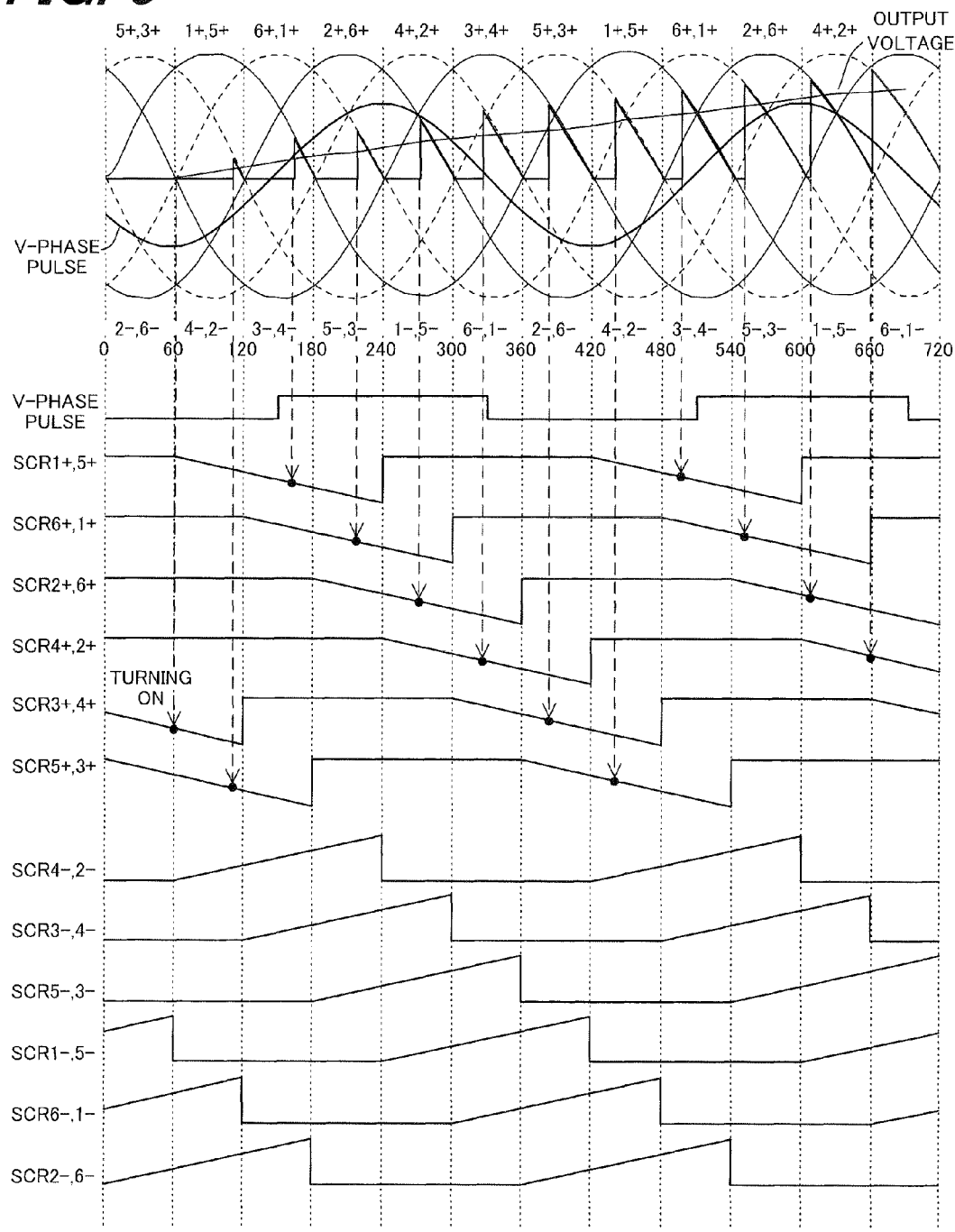
FIG. 5 is a time chart similarly showing the thyristor turning-on operation of the positive group converter and negative group converter by an effective voltage controller of the ECU shown in FIG. 1 when converting to alternating current.
Figure 6:
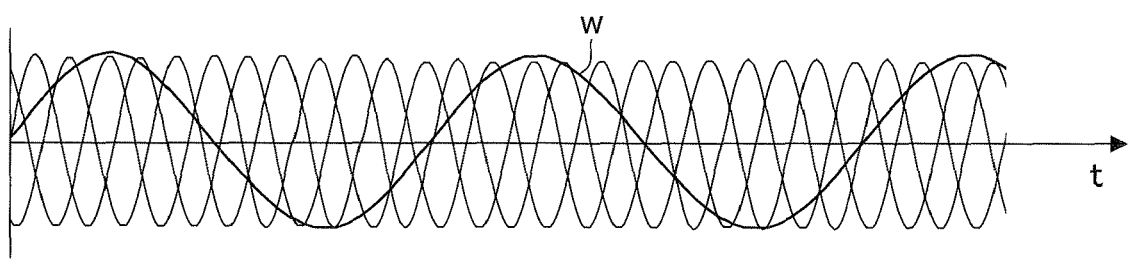
FIG. 6 is a time chart of a desired frequency waveform used in the operation of thyristor turning-on of the positive group converter and negative group converter shown in FIG. 5.

Based on the aforesaid phase signal and reference sawtooth waves, like those shown in FIG. 5, generated for respective ones of the 12 thyristors Pn, Nn, (designated SC n+, n− in the drawing) of the positive group converter 24a and negative group converter 24b, and based on the desired frequency waveform w, like that shown in FIG. 6, set by the operator using the frequency setting switch SW36 and the results of comparisons performed by comparators (not shown) installed in association with respective ones of the twelve thyristors Pn, Nn, the effective voltage controller 26b turns on the thyristors at the timings indicated by arrows in the drawing, thereby controlling the effective output voltage to the desired voltage. In FIG. 5, the voltages applied between UV, VW and WU are represented by solid curves and the voltages reversely applied between VU, WV, UW are represented by broken curves.

As shown in FIG. 3, the generated single-phase alternating current controlled to the desired effective voltage by the effective voltage controller 26b is smoothed by the smoothing capacitor 24c and supplied to the load 30 through the power feed line 28, more exactly power feed lines 28a and 28b. Thus, the cycloconverter is composed of the bridge circuit 24 and ECU 26.

When the engine 12 is started and the engine speed NE is increased to exceed an output enable threshold value, the effective voltage controller 26b starts to output the generated power, and when the engine speed NE becomes lower than a stop determination threshold value, it stops outputting the power.

Next, the explanation regarding the case of converting the three-phase alternating current to direct current will be made.

Figure 7:
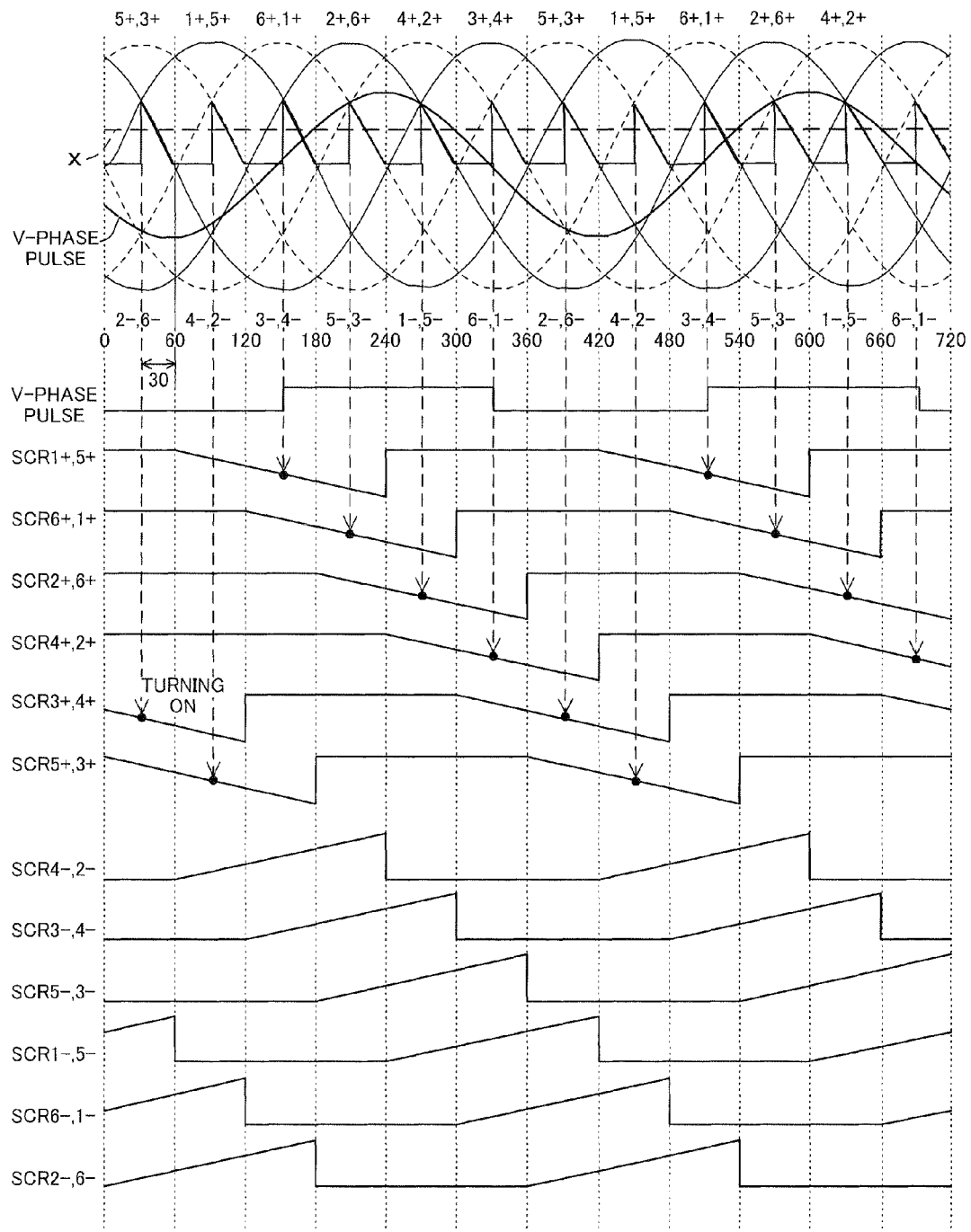
FIG. 7 is a time chart showing the operation of thyristor turning-on of the positive group converter and negative group converter by the effective voltage controller of the ECU shown in FIG. 1 when converting to direct current.

Explaining with reference to FIG. 7, based on the phase signal and reference sawtooth waves, like those shown in FIG. 7, similarly to the case of converting to alternating current, the effective voltage controller 26b turns on the thyristors of the positive group converter 24a and negative group converter 24b, precisely the thyristor of the positive group converter 24a, at the fixed angle of 30 degrees that is determined by a set (desired) voltage (by the user), as indicated by arrows in the drawing.

As a result, as shown in FIG. 7, an output of sawtooth wave type is generated by the positive group converter 24a. The generated output is smoothed by the smoothing capacitor 24c so that the output becomes close to direct current component, as indicated by x in the drawing, to be supplied to the load 30 through the power feed line 28a (positive) and power feed line 28b (grounded).

Figure 8:
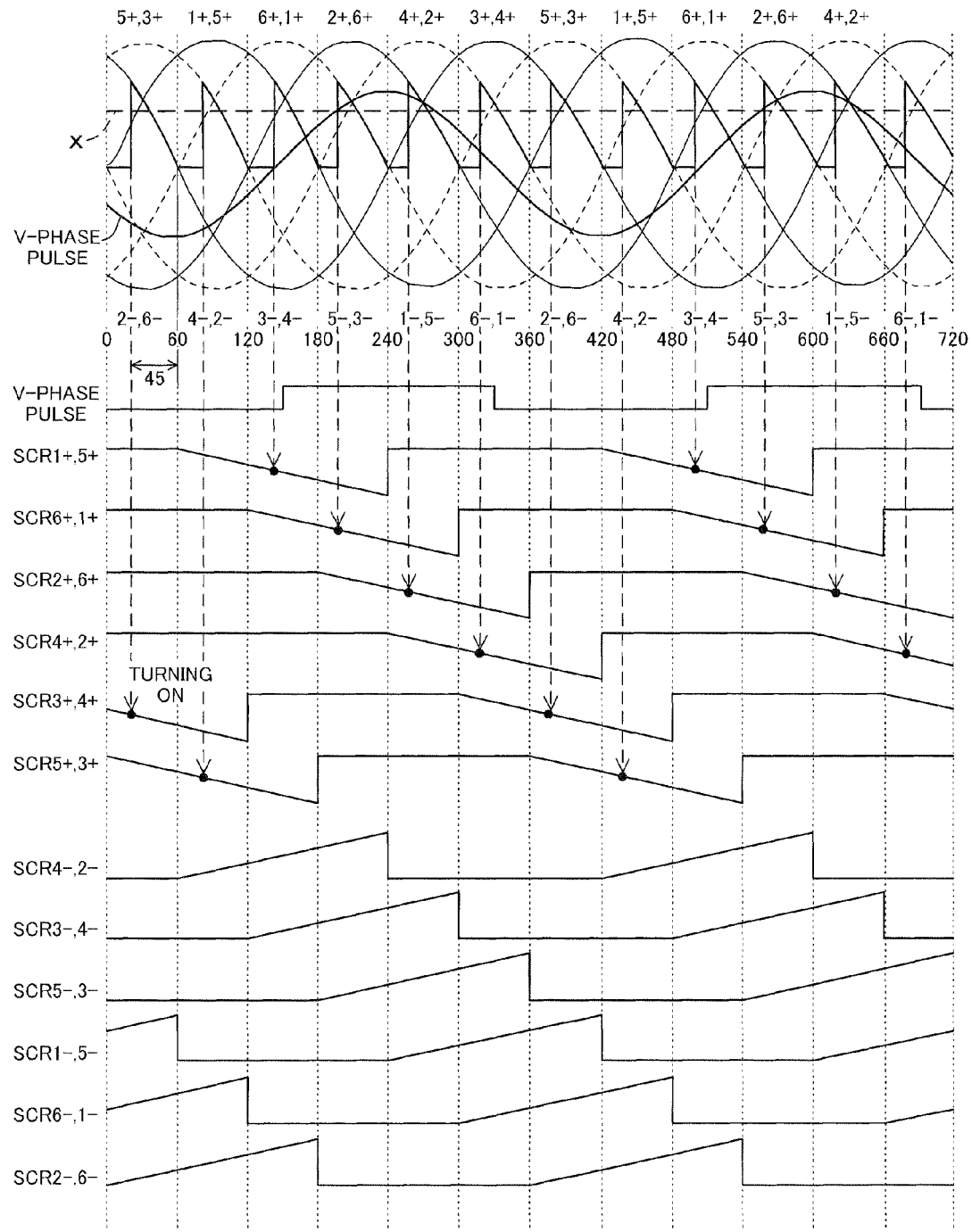
FIG. 8 is a time chart similarly showing the operation of thyristor turning-on of the positive group converter and negative group converter by the effective voltage controller of the ECU shown in FIG. 1 when converting to direct current.

FIG. 8 is a time chart of the case of thyristor turning on at the turning angle different from the example of FIG. 7, exactly at the angle of 45 degrees, i.e., the case of further increasing the turning angle. Thus, the voltage of outputted direct current increases with increasing turning angle of the thyristors Pn, i.e., increases with increasing voltage-increased angle.

As described in the foregoing, based on the phase signal, the effective voltage controller 26b generates single-phase alternating current of the desired frequency by turning on the positive and negative SCR (switching element) groups Pn, Nn of the bridge circuit 24 at variable width (timing) every half-period of the desired alternating current frequency, and generates direct current of the desired voltage by turning on either one of the positive and negative SCR (switching element) groups Pn, Nn, (Pn) at fixed width (timing) that is determined in accordance with the desired direct current voltage.

The above-mentioned generation of alternating current and direct current is described in the aforesaid reference in detail and will not be further explained here.

Returning to the explanation of FIG. 1, the control panel of the generator 10 is installed with a selection switch (SW) 40 to be operable by the user. When operated, the selection switch 40 produces an output or signal indicative of a result of the user's selection between alternating current and direct current.

Figure 9:
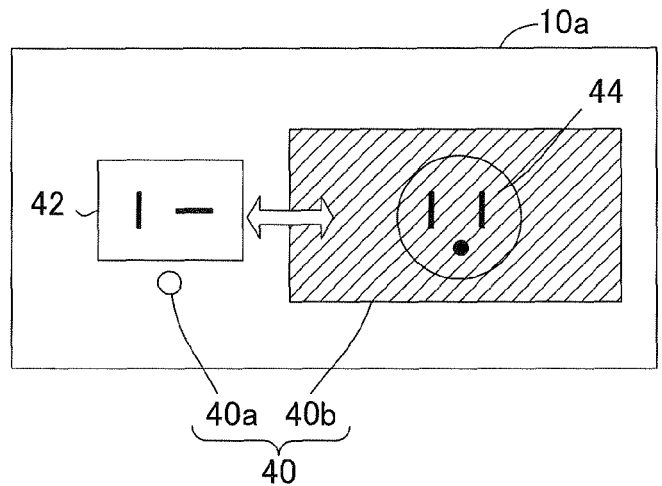
FIG. 9 is a front view of a selection switch provided in a control panel of the cycloconverter shown in FIG. 1.

FIG. 9 is a front view of the selection switch 40 in the control panel 10a of the generator 10.

As illustrated, the control panel 10a is disposed with a DC outlet 42 and AC outlet 44. The user inserts the plug of the load 30 into either one of the outlets 42, 44 to supply current to the load 30.

Figure 10:
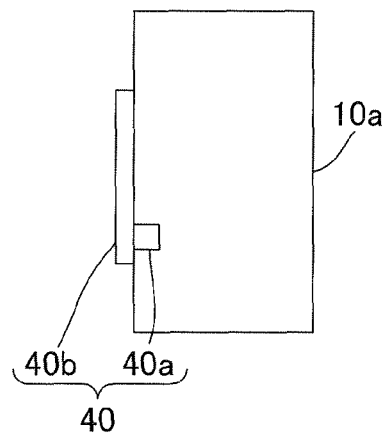
FIG. 10 is a side view of the selection switch shown in FIG. 9.
Figure 11:
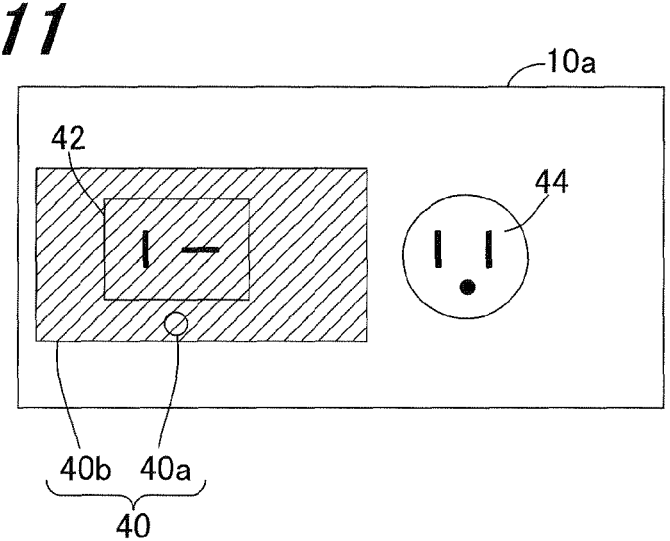
FIG. 11 is a front view similarly showing the selection switch provided in the control panel of the cycloconverter shown in FIG. 1.

The selection switch 40 comprises an electrical contact 40a that is provided near the DC outlet 42 and when pressed, produces an ON signal, and an outlet cover 40b that is made slidable between the DC outlet 42 and AC outlet 44 to block either one of the outlets 42, 44 from being connected. When the cover 40b is slid onto the DC outlet 42, it presses the electrical contact 40a as shown in FIG. 10, thereby producing an ON signal. FIG. 11 shows a case that the selection switch 40 is slid onto the AC outlet 44.

The output of the electrical contact 40a of the selection switch 40 is sent to the effective voltage controller 26b. Based on the output, the effective voltage controller 26b generates alternating current or direct current in the foregoing manner.

As stated above, the embodiment is configured to have a cycloconverter generator (10) equipped with a magneto (14) having three-phase output windings (16), single-phase output windings (20) facing the permanent magnets to produce phase signals each indicative of a phase of the output of the magneto, a bridge circuit (24) comprising positive and negative switching elements (thyristors; positive group converter 24a, negative group converter 24b) bridge-connected in antiparallel connection to the three-phase output windings to constitute a cycloconverter, and an AC power generator (effective voltage controller 26b) that generates single-phase AC power to be supplied to a load (30) by turning on the positive and negative switching elements at variable timing every half-period of a desired AC power frequency based on the phase signal, characterized by: a DC power generator (effective voltage controller 26b) that generates DC power to be supplied to the load by turning on one of the positive and negative switching elements in accordance with a timing determined by desired DC voltage based on the phase signal; and a selection switch (40) that is installed to be operable by an user and produces an output indicative of a result of the user's selection between the AC power and the DC power.

With this, it becomes possible to generate, in addition to alternating current, direct current of desired voltage, while enabling the user to easily select either one of alternating current and direct current by operating one of the AC power generator and DC power generator in response to an output of the selection switch 40 that is installed to be operable by the user.

The generator further includes a control panel (10a) disposed with a DC outlet (42) and an AC outlet (44); and the selection switch comprises: an outlet cover (40b) adapted to be slidable between the DC outlet and AC outlet to block either one of the outlets from being connected; and an electrical contact (40a) adapted to produces a signal when pressed by the outlet cover. With this, in addition to the foregoing effects, the user can surely connect the load 30 to an outlet (AC outlet 44, DC outlet 42) corresponding to the selected output.

It should be noted that, although the thyristor is used as a switching element, an FET or the like can be utilized instead.

It should also be noted that, although a direct current voltage is configured to be set by the user, it can be fixed at a value, e.g., 12V, used for charging a battery.

Japanese Patent Application No. 2008-123324 filed on May 9, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cycloconverter generator equipped with a magneto having three-phase output windings, single-phase output windings facing the permanent magnets to produce phase signals each indicative of a phase of the output of the magneto, a bridge circuit comprising positive and negative switching elements bridge-connected in antiparallel connection to the three-phase output windings to constitute a cycloconverter, and an AC power generator that generates single-phase AC power to be supplied to a load by turning on the positive and negative switching elements at variable timing every half-period of a desired AC power frequency based on the phase signal, comprising:

a DC power generator that generates DC power to be supplied to the load by turning on one of the positive and negative switching elements in accordance with a timing determined by desired DC voltage based on the phase signal; and a selection switch that is installed to be operable by an user and produces an output indicative of a result of the user's selection between the AC power and the DC power.

2. The cycloconverter generator according to claim 1, further including a control panel disposed with a DC outlet and an AC outlet;

and the selection switch comprises:

an outlet cover adapted to be slidable between the DC outlet and AC outlet to block either one of the outlets from being connected; and an electrical contact adapted to produce a signal when pressed by the outlet cover.

3. A method of controlling a cycloconverter generator equipped with a magneto having three-phase output windings, single-phase output windings facing the permanent magnets to produce phase signals each indicative of a phase of the output of the magneto, a bridge circuit comprising positive and negative switching elements bridge-connected in antiparallel connection to the three-phase output windings to constitute a cycloconverter, and an AC power generator that generates single-phase AC power to be supplied to a load by turning on the positive and negative switching elements at variable timing every half-period of a desired AC power frequency based on the phase signal, and a DC power generator that generates DC power to be supplied to the load by turning on one of the positive and negative switching elements in accordance with a timing determined by desired DC voltage based on the phase signal; characterized by the step of:

allowing an user to select one between the AC power and the DC power.

4. The method according to claim 3, further including the step of:

blocking either one of the AC power and the DC power from being connected.

* * * * *